United States Patent
Lightfoot

[15] 3,657,038
[45] Apr. 18, 1972

[54] METHOD OF BONDING EMPLOYING HIGH FREQUENCY ALTERNATING MAGNETIC FIELD

[72] Inventor: David Reginald Lightfoot, Silver Springs, Md.

[73] Assignee: W. R. Grace & Co., New York, N.Y.

[22] Filed: June 26, 1969

[21] Appl. No.: 836,803

[30] Foreign Application Priority Data

| July 31, 1968 | Great Britain | 36,582/68 |
| July 31, 1968 | Great Britain | 36,583/68 |
| July 31, 1968 | Great Britain | 36,584/68 |

[52] U.S. Cl. ............................ 156/106, 156/99, 156/275, 156/276, 156/309, 156/327, 156/291
[51] Int. Cl. ............................................. B32b 17/00
[58] Field of Search ............... 156/106, 276, 275, 309, 99, 156/327, 291

[56] References Cited

UNITED STATES PATENTS

| 2,510,727 | 6/1950 | Sussenbach | 156/275 X |
| 3,029,403 | 4/1962 | Krueger | 156/276 X |
| 3,117,054 | 1/1964 | Antonucci | 156/276 X |
| 3,179,544 | 4/1965 | Johannsen | 156/276 X |
| 3,258,032 | 6/1966 | Whittier et al. | 156/276 X |
| 3,314,838 | 4/1967 | Erwin | 156/276 X |
| 3,415,702 | 12/1968 | Bander | 156/276 |
| 3,444,021 | 5/1969 | Bilbe | 156/276 X |

Primary Examiner—Carl D. Quarforth
Assistant Examiner—Stephen J. Lechert, Jr.
Attorney—Richard P. Plunkett and Kenneth E. Prince

[57] ABSTRACT

This invention is directed to a method for effecting adhesion between two substrates, at least one of which is glass, which comprises forming an assembly to be bonded by interposing between the substrates and in contact with both, a thermally activatable adhesive composition containing particles of a material which is ferromagnetic or electrically conductive or both, and subjecting the assembly to the action of a high frequency alternating magnetic field until the adhesive has become activated.

13 Claims, 1 Drawing Figure

PATENTED APR 18 1972 3,657,038
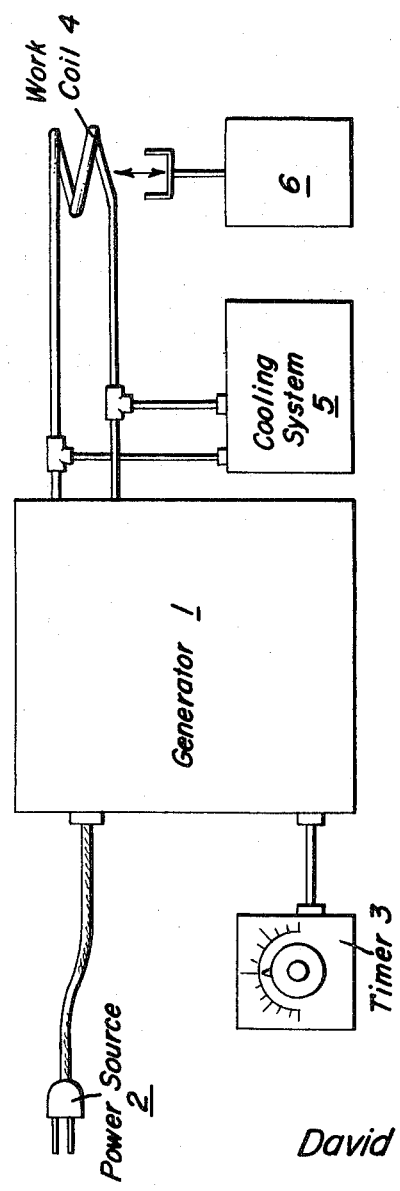
David Reginald Lightfoot
INVENTOR
BY Richard P. Plunkett
ATTORNEY

METHOD OF BONDING EMPLOYING HIGH FREQUENCY ALTERNATING MAGNETIC FIELD

This invention relates to the use of thermally activated adhesive compositions in joining two substrates, at least one of which is of glass.

In one aspect the invention consists in a method for effecting adhesion between two substrates as defined above, which comprises forming an assembly to be bonded by interposing between the substrates and in contact with both, a thermally activatable adhesive composition containing particles of a material which is ferromagnetic or electrically conductive or both, and subjecting the assembly to the action of a high frequency alternating magnetic field until the adhesive has become activated.

The process of the invention is based on the heating effect known in general terms as magnetic induction heating. The alternating magnetic field may have two primary effects, both of which result in heating of the ferromagnetic or electrically conductive material and thus of the adhesive composition in contact therewith. These effects are:

a. The occurences of rapid changes in the magnetic state of ferromagnetic material, accompanied by a hysteresis effect, and b. The generation of eddy currents in electrically conducting material.

The invention includes processes making use of either or both of these effects, neither of which is shown by ordinary thermoplastic or thermoset compositions or glass, so that little or no heat is generated directly in the surfaces to be bonded. Of course if the heating is continued for a long time the surfaces will be heated by conduction from the hot adhesive composition, but in practice the heating will never be continued substantially longer than is required for the formation of the bond since to do so would be wasteful of energy and time; moreover the glass substrate or substrates will not heat up quickly, and it is thus possible to obtain a strong bond without damage to the glass.

The method of the invention is primarily useful for bonding glass to glass, glass to polymeric substrate, or glass to a metal, but will also be useful in bonding glass to other kinds of substrate, such as wood. The substrates to be bonded may be comprised in separate bodies or within a single body. They may be in the form of sheets or in any other shaped form.

The adhesive composition may comprise a thermoplastic, hot melt, or thermosetting resin or a precursor thereof, e.g. a polymerizable monomer or low polymer, or a liquid crosslinkable system, which is capable of effecting adhesion between glass and other surfaces, which may be primed. The thermoplastic or hot melt composition may be plasticized or unplasticized. Examples of thermoplastic materials are olefin polymers, especially polyethylene, polypropylene and ethylene/propylene copolymers, including modified e.g. carboxylated, olefin polymers and copolymers; polystyrene, and vinyl polymers, e.g. polyvinyl chloride, vinyl chloride copolymers, e.g. with vinyl acetate, polyvinyl acetate, and polyvinyl acetals such as polyvinyl butyral. These materials may if desired or necessary, be plasticized. Suitable hot melt compositions include polyamides, ethylene/vinyl acetate copolymers (including terpolymers), mixtures of ethylene/vinyl acetate copolymers with hydrogenated wood rosins and/or other materials, e.g. as described in our British Pat. Specification No. 1,092,161. Thermosetting resin compositions include the cross-linking polyesters and epoxy-resins, as well as phenol-formaldehyde, urea-formaldehyde, and melamine-formaldehyde resins and the like. The composition may if desired contain two or more components, e.g. a melamine- or phenol-formaldehyde resin and a polyvinyl acetal.

In choosing a suitable adhesive for any particular combination of substrates, the ordinary knowledge of the art of adhesion will of course be employed. Thus any heat-activatable adhesive suitable for bonding glass to the particular substrate to be bonded can be employed in the adhesive composition. Other adhesives can be used if the surfaces to be bonded are suitably primed or chemically or otherwise pre-treated. For example the glass surface can be primed with a polysiloxane. It will therefore be understood that the term "glass substrate" as used herein includes bodies having a glass surface carrying an adhesion-improving coating as well as bodies having bare glass surfaces, and an analogous definition applies to the other kinds of substrate herein referred to.

The invention is not limited in respect of the nature of the ferromagnetic or electrically conductive material (inductive material) used, although naturally for practical purposes some such materials will be more effective, more convenient to use, or more economically desirable than others. Clearly the material should not be dissolved by or undesirably altered chemically by the adhesive composition or any component thereof. Subject to these obvious provisos any metallic or non-metallic element, alloy, or inorganic or organic compound having the requisite magnetic or electrical properties, and capable of being obtained in a suitable form, can be used.

Examples of preferred suitable inductive materials include a. Among materials which are both ferromagnetic and electrically conducting, iron, nickel, cobalt, and ferromagnetic alloys of iron and nickel, nickel and chromium nickel and manganese; and stainless steel;

b. Among materials which are electrically conducting but not ferromagnetic, carbon particles, copper, silver, gold, aluminium and silicon, alloys of two or more of these, e.g. alloys of aluminium and silicon, and aluminium and copper; and other corrosion-resistant alloys of aluminum with other metals. Such corrosion-resistant alloys generally comprise at least 50 percent by weight of aluminum;

c. Among materials which re ferromagnetic but not electrically conducting, barium ferrite.

In one embodiment of the invention the particles of inductive material are carbon particles which may be of graphite or amorphous carbon, e.g. carbon black. Graphite may be in the form of roughly spherical particles or thin platelets of various sizes. Such spherical particles usually have an average diameter of 30–100 microns or less Amorphous carbon is obtainable in a wide range of particle sizes, the particles again being roughly spherical. The use of carbon particles has several advantages over the use of ferro-magnetic particles in a similar way. They have a much smaller tendency to separate out under gravity when the composition melts, and thus remain more uniformly distributed and in general appear at the surface of the adhesive layer to a smaller extent; for a similar reason their use in initially liquid compositions is attended with less difficulty as the result of settling. Carbon is also found to be substantially free from the tendency to cause degradation or decomposition of the material of the adhesive which characterizes some ferromagnetic metals; moreover it is not subject to corrosion. Also, carbon particles are much less abrasive in mixing machinery and other devices used to make the adhesive composition.

In another embodiment of the invention the particles are of a ferromagnetic material. In this embodiment, the heating can be automatically controlled by employing a ferromagnetic material which is not electrically conductive or is in a form having at least one dimension sufficiently small to prevent the formation of eddy currents, or to keep such currents to a low level. In this case substantially all the heat will be generated by magnetic changes, and these will virtually cease when the Curie point of the ferromagnetic material is reached, so imposing a positive limit on the temperature employed. A still higher degree of control of this kind can be obtained by using a material whose ferromagnetic properties once lost, are not recovered until the temperature has fallen well below the Curie point; such materials are known, and include for example certain manganese alloys, e.g. nickel-manganese alloys containing up to about 15 percent of manganese.

If it is desired to control the temperature of the composition in this way when using a material which is both ferromagnetic and also electrically conductive, such for example as iron or an alloy thereof, it should be in a very finely divided form. Suitable particle sizes or dimensions are readily determinable for any particular material, preferably within the ranges specified below.

It may sometimes be considered that speed of heating is of more importance than the automatic temperature control obtained with the aid of the Curie point technique described above, and in such case it will be preferred to use an inductive material of a kind and of dimensions such that heat is generated both by magnetic hysteresis loss and by the generation of eddy currents. In a highly repetitive operation, the temperature reached can easily be controlled, if necessary after making routine trials, by a careful choice of the operating conditions, including the power and frequency of the source of the alternating magnetic field, the distance of the assembly to be bonded from the coil or the like by which the field is generated, and the time for which the assembly is subjected to the field.

The particles need not be composed wholly of the ferromagnetic or electrically conducting material. For example such material may be in the form of a coating on an inert electrically non-conducting support, such for example as very fine glass beads. Such support particles may have a diameter of 20–850 microns. The particles may advantageously be embedded in a resin-binder on the support. They may be deposited on the support, which will usually be roughly spherical, in any convenient manner; for example the support particles may be contacted with a colloidal suspension of graphite in water or some other liquid, which may advantageously contain also a non-conducting binder resin of known type. Composite (supported) particles of this kind are included within the term "particles" as used herein with reference to the ferromagnetic or electrically conductive material.

While there is no critical upper limit to the size of the individual particles of inductive material (which will depend on such factors as their influence on the mechanical strength and desired thickness of the final adhesive layer) it may be taken as approximately 1 mm, and in most circumstances about 400–500 microns. As a general rule the particle size of the inductive material should not be lower than 30 microns and will preferably be about 50–200 microns, and especially 75–150 microns. Even when a conducting network is formed, the above size ranges will usually be found to be most suitable. Other things being equal, the larger the particles the more rapidly will the adhesive reach its activation temperature.

The weight ratio of particles of inductive material to adhesive material may be varied over a wide range, e.g. from 5:95 to 80:20, and will be chosen with regard to the particular requirements of each case. Naturally the higher the ratio the more rapidly will the composition be heated by a field of any given frequency and strength. On the other hand, the use of a high proportion of particles will often increase the stiffness of the final adhesive layer, which will not always be desirable; also it may decrease the wetting power of the adhesive for the surfaces to be joined, and may also decrease the cohesive strength of the adhesive layer, especially when the proportion is towards the upper end of the range. The importance of these effects will vary a good deal with the nature of the adhesive composition. Thus, compositions comprising highly crystalline polymers, e.g. high density polyethylene, are particularly sensitive, since the particles tend to be concentrated in the amorphous parts of the polymer layer, so that very high local concentrations arise even when the overall loading is comparatively low.

When the inductive particles are of carbon and quite separate from each other, the lower limit is set by the fact that their thickness must be at least twice the effective depth of current penetration. However if the concentration and distribution of the carbon particles is such that a number of particles together form an electrically conducting network, smaller particles can be used. The depth of current penetration is determined by various factors including the frequency and strength of the alternating magnetic field, and thus no definite lower limit for particle size can be given, but as a general rule the particle size will be from 30–200 microns. When the electrically conductive particles are of carbon and are small e.g. particles of diameter below 30 microns, so that it becomes necessary to rely on the formation of an electrically conductive network as already described, the concentration of the carbon particles should be sufficient to give a suitable bulk volume resistivity, generally between $10^2$ and $5 \times 10^4$ ohm-cm. for the best results.

The frequency of the alternating magnetic field used for the heating operation may be from 0.5 to 100 megacycles/second or higher, but will usually be 15 to 30 megacycles/second. Any suitable source of sufficient power output can be employed; typical sources have power outputs of 0.1 to 30 Kw, but an output of 2 to 5 Kw will generally be most suitable. It is preferred to choose the frequency and field strength in accordance with the size and shape of the workpiece and the composition of the adhesive, so as to give an effective heating time of 2 minutes or less, usually a few seconds.

Apparatus which can be used for carrying out the process of the invention is illustrated diagrammatically in the accompanying drawing, and consists of a generator 1 connected to a power supply 2, and an electrically operated timing device 3 adapted to operate the generator so that the alternating field is applied to a work coil 4 fro a predetermined and preset time. A typical generator has a rating of 5 Kw and operates at 27.12 megacycles per second. The work coil and its immediate surroundings are provided with cooling means, preferably a thermostatically controlled, closed circuit system 5 in which distilled water is used as the cooling medium. (Less pure water gives rise to greater energy losses in the cooling system, and may itself become heated sufficiently to destroy or reduce its effectiveness). Various mechanisms, indicated schematically at 6, may be used to transport the assembly to be bonded to the proper position within the work coil. The configuration of the work coil will be chosen so as to be suited to the shape and size of the assembly.

An alternative procedure is to keep the assembly stationary but move the work coil.

The invention is particularly useful in relation to double glazing, and most particularly in the production of units in which two sheets of glass, held apart by spacers, are sealed together at their edges.

According to an embodiment of the invention there is provided a method of making double glazing material by forming an assembly of two parallel sheets of glass separated by spacers and effecting adhesion between the glass and the spacers which comprises interposing between each sheet of glass and the spacer a layer of a heat-activatable adhesive composition, adapted to bond to glass and the plastics material of the spacer, and containing particles of a material which is ferromagnetic or electrically conducting or both ("inductive" particles), and while the glass is held in contact with the spacer (through the interposed adhesive) subjecting the assembly to the action of a high frequency alternating magnetic field until the adhesive composition has become activated.

In another aspect the invention includes the double glazing material so obtained, which is characterized by the presence of an inductive material in the adhesive layers between the glass and the spacer.

In making the assembly the adhesive composition may initially be applied to the glass or the spacer or both. For convenience of working it may be found preferable to apply it to opposing faces of the spacer before building up the assembly.

The apparatus described above can be used for making the double glazing material. After the activation of the adhesive composition, and preferably after the subsequent cooling of the assembly, the edges of the assembly may if required be sealed, or further sealed, in any known or suitable desired way.

In known double glazing units the spacers are generally of lead, for example lead strips. The invention is useful for making double glazing units containing such spacers, the adhesive being interposed between the glass and lead.

While double glazing units are commonly made with lead spacers, plastics materials have certain advantages in that they are not subject to corrosion and also, if suitably chosen, are not easily deformed. However, it has hitherto not been practicable to use plastics strips for this purpose without first providing them with a metal coating. The present invention provides a means whereby this can be done. Furthermore, by causing relative movement between the source of the magnetic field and a line of double-glazing units to be assembled, e.g. by passing the units in turn past a stationary magnetic source, large-scale production of double-glazing units with plastics spacers becomes commercially attractive.

Any suitable plastics (i.e. organic polymeric) material may be used for making the spacers; generally speaking the material should be one which retains its strength and dimensions, and preferably also its color, substantially unchanged over long periods during which it may be exposed to a relatively wide range of temperatures and of light intensities. Thus it will usually be preferred not to use a halogen-containing material, such as a vinyl chloride or vinylidene chloride polymer or copolymer unless it is very well stabilized or is inherently stable as are the polyfluorocarbons. Olefin polymers such as polyethylene or polypropylene may be used, especially high density polyethylene and polypropylene having a high degree of isotacticity; copolymers of two such olefins can also be used, as can copolymers of the olefins with vinyl or other addition-polymerizable monomers, e.g. vinyl acetate. Polymers and copolymers of other vinyl compounds, such for example as acrylonitrile and acrylic and methacrylic acids and their methyl, ethyl or other esters are also useful. The above polymers can if desired be cross-linked by known means so as to increase the resistance of the spacers to deformation during the production or the life-time of the glazing.

The spacers can also be made from condensation polymers, e.g. polyamides, polyesters, polyurethanes and the like, which again may be cross-linked if desired. Examples include 6,6-nylon, 6-nylon, 11-nylon, polyethylene terephthalate, and polyurethanes derived from 2,4- and/or 2,6-toluene diisocyanate and a polyether or polyester-polyol, especially a polyether polyol obtained by condensing an alkylene oxide, usually ethylene and/or propylene oxide, with a tri- or higher polyhydric alcohol. All such materials are well known and need not be further described here.

Spacers of thermoset resins such for example as phenol-formaldehyde, urea-formaldehyde, melamine-formaldehyde and similar products can be used if desired, but generally with less advantage. In such cases curing can be completed before assembling the components or during the activation of the adhesive.

If desired the plastics material may contain a filler and/or other additives required for special purposes; it can be homogeneous in structure, or formed with open or closed cells.

The plastics strip may be in the form of a solid rod of square, rectangular, circular or other suitable cross-section, or it may be hollow. Hollow rod or the like may with advantage be provided with apertures communicating with the space between the glass sheets, and contain a moisture absorbing material which can remove water vapor from the said space so as to prevent condensation of water on the inner surfaces of the glass sheets at low temperatures. Solid and hollow rods can if desired be provided with perforations through which the space between the glass sheets can be evacuated, after the perforations can be sealed off as to preserve the resulting vacuum.

In another embodiment of the invention the plastics strip may be formed from a material which can act as an adhesive and which contains inductive particles. The inductive particles will desirably be concentrated at the surfaces of the plastics strip. For example, the plastics strip may be a laminate in which the two outer most layers are made from an adhesive composition containing inductive particles, and the interior layer or layers from the same or a different material which does not contain inductive particles.

The following examples illustrate this invention; "parts" and proportions are by weight.

EXAMPLE 1

Sets of two glass strips, 1.3 cm. wide, 0.62 cm. thick and 3.8 cm. long were bonded with lap joints with the adhesive compositions listed below, the length of the overlap being 1.3 cm. in each case. The glass surfaces were not degreased or chemically treated in any manner. All the adhesive compositions contained approximately 50 percent by weight of polymer and 50 percent by weight of sponge iron powder of particle size 44–150 microns. Bonding was carried out using a 1.2 Kw generator operating at 27.12 megacycles per second and an anode current of 0.19 amp. The assemblies were held together under contact pressure during bonding.

The table below lists the adhesive used, the bonding time and the lap shear strength obtained at 20° C. using a cross-head travel speed of 25.4 cm./minute.

| Adhesive in adhesive composition | Bonding time (seconds) | Lap shear strength (kg./cm.$^2$) |
|---|---|---|
| "Surlyn A" | 7.5 | 12.5 to 14.7 |
| 60 parts "Elvax 210"/40 parts "Foral 105" | 4 | 11.2 |
| 60 parts "Foral 105"/40 parts "Elvax 410" | 4 | 14.1 to 16.8 |
| "190–C–5" | 5 | 14.7 to 28.7 |
| 40 parts "Butvar B90"/30 parts "Santicizer 8"/30 parts "SP 1068" | 6 | 8.4 to 16.8 |
| 50 parts "Butvar B90"/50 parts "Santicizer 8" | 6 | 14.1 to 19.6 |
| "QX 3623.44" | 8 | 14.7 |
| "QX 3623.17" | 10 | 8.4 |

Key to the nature of the adhesives

"Surlyn A"SurlynA" is a thermoplastic material containing ionic bonds, and described in a Du Pont information Bulletin of that name dated Sept. 1965.

"Elvax 210" and "Elvax 410" are ethylene/vinyl acetate copolymers made by E.I. Du Pont de Nemours & Co. having polyvinyl acetate contents of 27–29 percent and 17–19 percent by weight respectively and melt indices of 340–470 and 430–580 respectively.

"Foral 105" is the pentaerythritol ester of stabilised rosin (hydrogenated wood rosin) made by Hercules Chemical Co.

"190–C–5" is a blend of 60 parts Versalon 1140 and 40 parts Versalon 1200; these are polyamide resins sold by General Mills Ltd.

"Butvar B90" is a polyvinyl butyral made by Shawinigan Ltd.

"Sacticizer 8" is a mixture of o- and p-toluene-N-ethylsulphonamides.

"QX 3623.44" and "QX 3623.17" are carboxylated low density polyethylenes manufactured by the Dow Chemical Co. of carboxyl group content 1.1 meg./g. and melt indices 20 and 400 respectively.

The bond strengths in this and the following examples were measured on an "Instron" tensile testing machine using a cross-head speed of 25.4 cm./minute; except in Example 2 the pen recorder supplied with the machine was employed. However the response time is then about 2 seconds, and in some cases at least the joint failed before the maximum load was recorded. In such cases the use of a quicker responding and hence more accurate ultra-violet recorder would show considerably higher values.

EXAMPLE 2

Glass strips of the dimensions given in Example 1 were bonded to strips of nylon 610 of the same dimensions, to give a lap joint, the overlap being 1.3 cm. The nylon strips were coated with a layer about 400 microns thick of an adhesive composition of 50 parts of "190–C–5" and 50 parts of the sponge iron powder used in Example 1. The bonding time was 8 seconds and the anode current 0.19 amps. The bond strengths were found to be from 21.1 to 26.7 kg./cm.$^2$ using an ultra-violet recorder on the "Instron".

EXAMPLE 3

Glass strips of the dimensions given in Example 1 were bonded to strips of polyethylene of the same dimensions to give a lap joint, the overlap being 1.3 cm. The polyethylene strips were coated with an adhesive composition consisting of 50 parts of "QX 3623.17" and 50 parts of the sponge iron powder used in Example 1. The bonding time was 8 seconds and the anode current 0.19 amps. The lap shear strength of the bonds was 11.2 kg./cm.$^2$.

EXAMPLE 4

Glass strips of the dimensions given in Example 1 were bonded to strips of "QX 3623.17" the overlap being 1.3 cm., using a thin layer of the same adhesive as in Example 3. The bonding time was 8 seconds and the anode current 0.19 amps. The lap shear strength of the bond was 14 kg./cm.$^2$.

The same generator and operating frequency were used in all the examples.

EXAMPLE 5

A graphite-containing adhesive composition was made by blending in Winkworth Z blade mixer 30 parts of graphite in the form of platelets (Foliac Graphite, Large Flake 1A — Graphite products Ltd.), 42 parts of Versalon 1140 and 28 parts of Versalon 1200. A sheet 0.5 mm thick of this composition was formed by compression moulding at 155° C. A sample cut from this sheet was placed between two strips of glass as in Example 1 to form a lap joint of overlap 1.3 cm. The assembly was held together under contact pressure and placed in a four turn barrel coil connected across the output of the generator of Example 1 using an anode current of 0.25 amp. for 60 seconds. The assembly was allowed to cool for 1 minute and then removed from the work coil. The lap shear strength of the bond obtained was 8.4 kg./cm.$^2$.

The methods of causing adhesion specifically described in the above examples can be employed with excellent results for sealing the edges of parallel glass sheets to form double glazing units.

EXAMPLE 6

This example illustrates the production of lead-spaced double-glazing material.

An assembly was made up comprising two sheets of glass held apart by spacers consisting of lead strips, the two sides of which had been coated with an adhesive composition consisting of 50 parts of a carboxylated low density polyethylene ("QX 3623.17", supplied by Dow Chemical Co.) and 50 parts of sponge iron powder of particle size 44–150 microns. The assembly, under contact pressure was placed within the work coil of a system as described above by reference to the drawing, using an anode current of 0.19 amp and a heating time of 5 seconds.

Tests made on sample assemblies of glass and lead strips under the same conditions and using the same adhesive showed that the joint had a lap shear strength of 11.2 kg./cm/$^2$. determined on an "Instron" tensile testing machine using a cross-head speed of 25.4 cm./minute, and the pen recorder supplied with the machine.

To illustrate that the heating effect is due largely to the presence of the inductive particles in the adhesive the following tests were performed, two samples of low density polyethylene powder were placed each on a lead strip, and then inserted in the four turn barrel coil. The first consisted wholly of the polyethylene, and the second of 43 percent of the polyethylene and 57 percent of the sponge iron powder. The anode current was 0.19 amp. The first sample melted in 6 seconds, the second in 4 seconds.

EXAMPLE 7

This example illustrates the production of double glazing units having a plastics spacer.

Double glazing units were made using spacers of polyethylene or 6,6-nylon rod of rectangular cross-section, and the adhesive compositions described in the Examples 1–5. Excellent results were obtained.

EXAMPLE 8

An adhesive composition was prepared from equal parts by weight of polystyrene, commercially available from Sterling Molding Materials Ltd. under the trade name "Sternite 122" and aluminum powder (53–120 microns) particles by compression molding to give a sheet of 0.020 inch thickness. A glass strip, 1.3 cm. wide, 0.62 cm. thick and 3.8 cm. long was bonded to a strip of 316 stainless steel of the same dimensions with lap joints using the aforesaid adhesive composition, the length of the overlap being 1.3 cm. The assembly of the glass strip, adhesive and stainless steel strip was held under contact pressure and inserted in a four turn barrel coil, connected across the output of a 1.2 Kw induction generator operating at 27.12 megacycles. Power was supplied to the coil by an anode connected to 0.190 amperes for 10 seconds. A good bond strength resulted on cooling

EXAMPLE 9

Example 8 was repeated except that the 316 stainless steel strip was substituted by a polyethylene strip of the same dimensions having a density of 0.96 and a melt index of 0.7. A commercially acceptable bond was formed in 10 seconds.

What is claimed is:

1. A method for effecting adhesion between two substrates, at least one of which is glass, which comprises interposing between said substrates and in contact with both, a thermally activatable adhesive composition consisting essentially of a mixture of 20–95 parts by weight of a polymeric material and 5–80 parts by weight of a member of the group consisting of non-conductive ferromagnetic particles, electrically conductive non-ferromagnetic particles and ferromagnetic, electrically conducting particles thereby forming an assembly, subjecting said assembly to the action of a high frequency alternating magnetic field for a time sufficient to heat activate the polymeric material in the adhesive composition and thereby cause adhesion between said substrates.

2. The method according to claim 1 wherein said particles have an average diameter of 30–1000 microns.

3. The method according to claim 1 wherein said electrically conducting non-ferromagnetic particles are selected from the group consisting of carbon, copper, silver, gold, aluminum, silicon, alloys of aluminum and silicon and alloys of aluminum and copper.

4. The method according to claim 1 wherein the electrically conducting, ferromagnetic particles are selected from the group consisting of iron, nickel, cobalt, ferromagnetic alloys of iron and nickel, nickel and chromium, nickel and manganese and stainless steel.

5. The method according to claim 1 wherein the polymeric material is a member of the group consisting of polyolefin, vinyl polymer, polyamide, polyesters, and formaldehyde copolymers.

6. The method according to claim 5 wherein the polyolefin is a member of the group consisting of polyethylene, oxidized polyethylene, polypropylene and ethylene/propylene copolymers.

7. The method according to claim 1 wherein one of the substrates is glass and the other is a polymeric material.

8. The method according to claim 1 wherein one of the substrates is glass and the other is a metal.

9. The method according to claim 1 in which there is formed an assembly of two substrates spaced apart by at least one spacer, the adhesive composition being interposed between each substrate and the, or each spacer.

10. The method according to claim 9 wherein the spacer is lead.

11. The method according to claim 9 wherein the spacer is a polymeric material.

12. The method according to claim 11 wherein the adhesive composition is interposed by embodying the adhesive composition in appropriate surfaces of the spacer.

13. The method according to claim 12 wherein the composition is embodied in the surface of the spacer by prelaminating strips of the adhesive composition to a strip of the polymeric spacer material.

* * * * *